Dec. 15, 1959  D. SAMIRAN  2,916,787
FASTENER
Filed Sept. 21, 1955  2 Sheets-Sheet 1

INVENTOR.
DAVID SAMIRAN
BY
*Frank S. Ackerman*
ATTORNEY

Dec. 15, 1959  D. SAMIRAN  2,916,787
FASTENER
Filed Sept. 21, 1955  2 Sheets-Sheet 2

INVENTOR.
DAVID SAMIRAN
BY
*Frank H. Harmon*
ATTORNEY

2,916,787
FASTENER

David Samiran, Cleveland, Ohio, assignor to Aero Supply Manufacturing Company, Inc., Corry, Pa., a corporation of New York Application September 21, 1955, Serial No. 535,666

4 Claims. (Cl. 24—215)

The present invention relates in general to fasteners, and more particularly to improvements in snap fasteners for releasably fastening members together, such as, for example, fastening aircraft fuel cells to the frame of the aircraft.

An important object of the present invention is to provide a new and improved, durable, lightweight, readily installable fastener, which will be reliable and simple in operation.

Another, and more specific object of the present invention is the provision of new and improved hanger assembly including a snap fastener for quickly and easily detaching fuel cells to the frame of an aircraft.

A further object of the present invention is to provide a new and improved pull-out snap fastener in which the resiliency of the snap ring biases it into engagement with abutment means carried by the fastener, the construction and position of the abutment means determining the forces necessary to respectively engage and pull out the fastener.

A still further object of the present invention is the provision of a new and improved fastening device which comprises a stud member, a socket member for receiving the stud member, one of the members being formed of two parts which cooperate with each other to form an annular space for receiving a snap ring, and abutment means at one side of the annular space beyond which the ring extends to engage the other member of the fastener device, the abutment means determining respectively the engaging and pull-out force for the fastener.

With the foregoing and other objects in view, the invention resides in the combination of parts and in the details of construction hereinafter set forth in the following specification and appended claims, certain embodiments thereof being illustrated in the accompanying drawings, in which:

Figure 1:
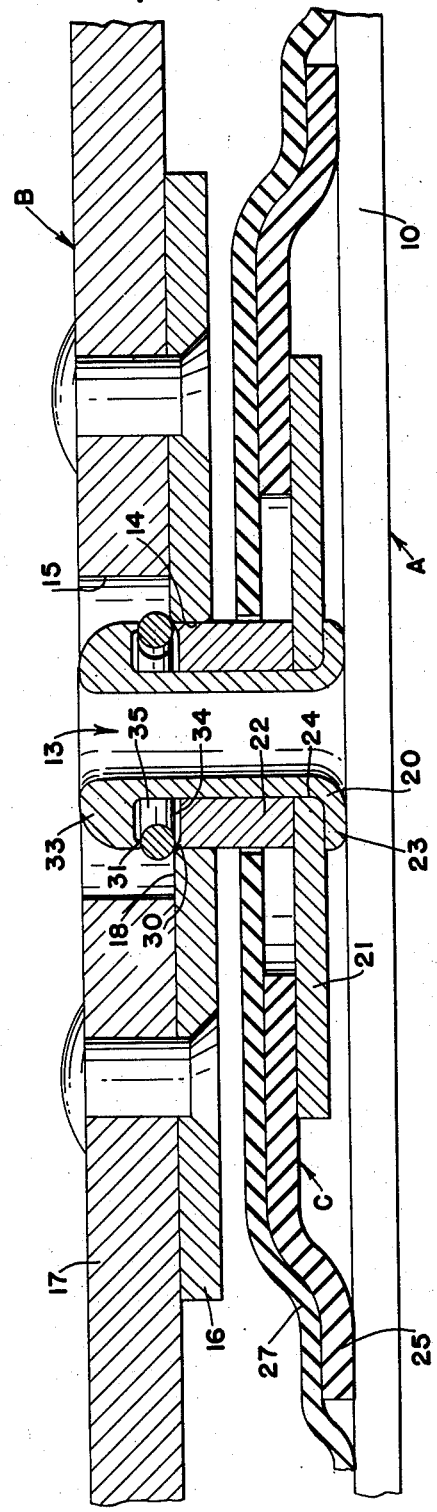
Figure 1 is a fragmentary sectional view showing a fuel cell fastened to the frame of an aircraft in accordance with the present invention.
Figure 2:
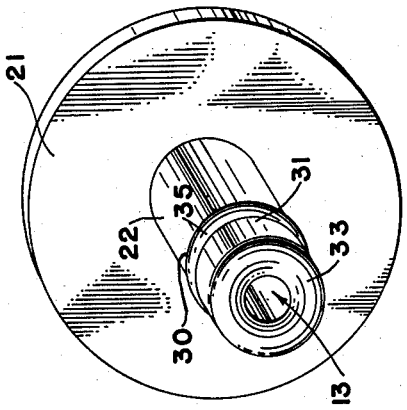
Figure 2 is a view in perspective of the member of the fastening device carried by the fuel cell shown in Figure 1.

Referring more particularly to the drawings, I have shown in Figure 1 a fuel cell A having a side wall 10, which wall is the only wall of the fuel cell shown in the drawings, and which is detachably connected to the frame of an aircraft, a portion of which frame has been shown and designated by the reference character B, by a hanger assembly C.

The hanger assembly C comprises a fastening device, or button assembly, including a stud member 13 adapted to be received by a socket in the frame assembly B, which socket in the illustrated embodiment is formed by a pair of aligned holes 14 and 15 in plates 16 and 17, which are riveted together, the plate 17 being a part of aircraft frame. The plate 16 is adjacent to the fuel cell and the hole 14 therein is of such a diameter that the stud member 13 fits closely therein. The hole 15 in the plate 17 is of larger diameter than the hole 14 thereby forming a shoulder 18 extending between the holes.

The stud member 13 comprises a body portion 20, in the illustrated embodiment, carried by a base plate 21 and a bushing or collar portion 22 coaxial about the body portion. The lower end of the body portion is flared to form a flange 23 which cooperates with the lower end of the collar portion 22 to clamp the stud member 13 to the base 21, the body portion of the stud member passing through a hole 24 in the base plate.

The base plate 21 is loosely mounted on the fuel cell wall 10 by a disc 25 which is held in place by a retainer 27 preferably of rubber and preferably securely cemented to the fuel cell wall 10. The disc 25 is intermediate the rubber retainer 27 and the base plate 21 and retainer 27 and the disc 25 each have an opening for passing the stud member 13, the opening in the retainer 27 closely fitting the collar portion 22 of the stud member.

The upper end of the collar portion 22 as viewed in Figure 1, is provided with a circumferential, axially extending portion which forms an abutment on jaw 30 which is opposed to and spaced from an abutment on jaw 31 formed by a circumferential, axially extending flange on a head 33 at the upper end of the body portion 20. The head 33 and the collar portion 22 have substantially the same diameter and the flanged portions thereof form the outer sides of recesses in the upper end of the collar portion and the underside of the head respectively, which provide an annular space or opening 34 for receiving a snap ring 35, the space 34 being of sufficient size to entirely accommodate the snap ring 35.

Figures 3, 4:
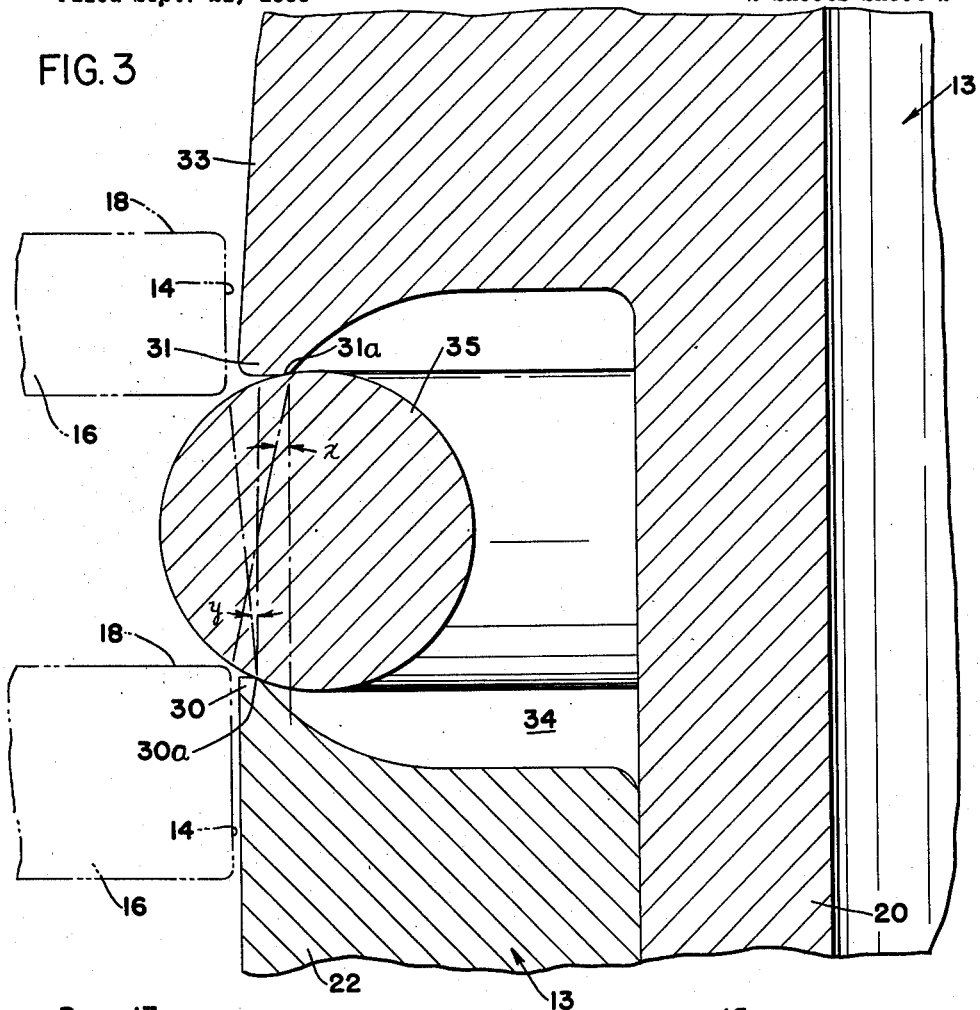
Figure 3 is an enlarged fragmentary sectional view of the fastening device shown in Figure 1.
Figure 4 is a fragmentary sectional view of a fuel cell fastened to the frame of an aircraft by an alternate form of the present invention.

The snap ring 35 is preloaded so that it biases itself against the jaws 30 and 31 at points 30a and 31a respectively. As is best shown in Figure 3, the ring 35 engages the inner edge of the jaws 30 and 31 and a portion of the ring extends radially beyond the head and collar portion of the stud member to a position for engaging the shoulder 18 of the socket formed by the frame assembly to provide a means for holding the stud member 13 in the socket. The snap ring 35 is a split ring and when a sufficient compressive force is applied to the ring it will move radially inwardly to allow the stud member to move into or out of the receiving socket.

The force necessary to pull the stud member 13 from its socket is determined by the location of the point of engagement 31a between the jaw 31 and the snap ring, which in turn determines the pressure angle "$x$" of the shoulder 18 on the snap ring 35 when the stud member is pulled outwardly of its socket. The larger the pressure angle the larger the force necessary to withdraw the ring.

When the stud member is inserted into its socket in the frame assembly the edge of the opening 14 will engage the snap ring 35 and exert a force tending to move the ring inwardly in the annular space 34 to permit the passage of the stud member 13 through the opening 14. The force necessary to insert the stud member 13 into its socket is determined by the location of the point of engagement 30a between the jaw 30 and the snap ring, which in turn determines the pressure angle "$y$" between the edge of the opening 14 and the snap ring 35. Preferably the width of jaw 30 is less than the width of jaw 31 so that the point 31a is inwardly of the point 30a and the push-in force necessary to insert the stud member is less than the pull-out force necessary to remove the stud member from its socket.

It can now be seen that the force necessary to engage the stud member 13 or pull it out can be controlled by controlling the pre-loading force applied to the snap ring and by varying the width of jaws 30 and 31 to vary the positions of the points of engagement 30a and 31a, and, in turn, the pressure angles "x" and "y."

An alternate form of the present invention is illustrated in Figure 4. Referring to Figure 4, a male or stud member 45 of cylindrical shape is mounted on a base plate 46 supported on and fixed to the shoulder 18, the stud member 45 extending through the opening 14.

The fuel cell A is detachably connected to the frame B by a hanger or socket assembly 47 adapted to receive the stud member 45 and including a two-part female member 48 mounted on a base plate 49 which is loosely connected to the wall 10 of the fuel cell by the disc 25 and the retainer 27 in the same manner as the base plate 15.

A snap ring 50 is positioned in an annular space 51 in the female member 48. The annular space is formed between rings 52 and 53, constituting the upper and lower portions respectively of the member 48 as viewed in Figure 4. The ring 52 is spaced from the ring 53 by a flange 54 depending from its outer peripheral edge and is securely fastened to the lower ring 53 by a collar portion 55 which is integral with the lower ring and which extends upwardly from the outer peripheral edge thereof. The collar portion 55 is turned inwardly at its upper end and the unturned portion 56 is received in an annular recess in the ring 52.

The snap ring 50 is pre-loaded so that it tends to move radially inwardly of the rings 52 and 53 into engagement with spaced abutments or jaws 57 and 58 on the rings 52 and 53 respectively, the jaws limiting the inward movement of the snap ring but permitting a portion of the snap ring to extend into the central opening of the female member 48. The stud member 45 is provided with an annular groove 59 adapted to receive the snap ring 50 and detachably connect the female member 48 and the stud member.

As in the case of jaws 30 and 31 of the first described embodiment, the width of the jaws 52 and 53 determine the pull-out and push-in force necessary to detach or fasten the fuel cell and the frame assembly, since the width of the jaws determines the position of the points of engagement between the jaws and the ring. For a given pre-loading of the snap ring the width of the jaw 53 determines the push-in force and the width of the jaw 52 determines the pull-out force.

While embodiments of the present invention have been described in considerable detail, it is hereby my intention to cover all modifications, constructions and arrangements that fall within the practice of those skilled in the art and the scope and spirit of the appended claims.

What I claim is:

1. A fastening device comprising a body member having an annular recess therein opening into a side wall thereof, first and second abutments on opposite sides of said recess adjacent to said side wall, a resilient member adapted to be accommodated within said recess positioned in said recess and pre-loaded so as to be biased into engagement with said abutments, the spacing between said abutments being less than the thickness of said member and a portion of said member extending between and beyond said abutments, said abutments engaging said resilient member at points which are different distances from said side wall.

2. In a fastening device, a body member having a cylindrical side wall and an annular recess opening into said side wall, a radially yieldable resilient snap ring in said recess and of a size to be accommodated therewithin, said snap ring being stressed so that it tends to move radially from said recess in the direction of said side wall, means on said member defining first and second spaced opposed abutment means on opposite sides of said recess adjacent to said side wall for restricting said opening and preventing the movement of the ring therefrom, said ring engaging said abutments and extending therebetween to a point outwardly of said side wall with the points of engagement of the ring with said first and second abutments being different distances from said side wall.

3. A fastening device comprising a stud member adapted to be received by a female member, a resilient snap ring positioned in a recess in said stud member, said recess being of sufficient size to accommodate said ring and opening into a side wall of said stud member and said ring tending to assume a diameter which would cause at least a portion thereof to extend outwardly of said side wall, means defining first and second spaced annular abutments on opposite sides of said recess adjacent to said side wall for engaging said snap ring and permitting only a portion thereof to extend beyond said side wall, said abutments constraining said ring to a diameter smaller than the diameter which it tends to assume and engaging said ring at points on the periphery thereof which are displaced radially of said ring from each other.

4. In a fastening device, a stud member comprising a cylindrical member having a head portion and an axially inwardly extending flange at the periphery of said head portion, a bushing having substantially the same diameter as said head portion on said member, said bushing being spaced from the flanged side of said head portion and having a peripheral flange extending toward said head portion but terminating short thereof, a radially yieldable snap ring positioned in the space between said head portion and said bushing and pre-stressed into engagement with said flanges, said flanges being of different widths so as to contact the periphery of the snap ring at different radial points and permitting a portion of said ring to extend therebetween to a position outwardly of said bushing.

References Cited in the file of this patent

UNITED STATES PATENTS

| | | |
|---|---|---|
| 489,891 | Adams | Jan. 10, 1893 |
| 574,265 | Pringle | Dec. 29, 1896 |
| 942,129 | Broga | Dec. 7, 1909 |
| 1,454,890 | Harpe | May 15, 1923 |
| 1,559,279 | Pierce | Oct. 27, 1925 |
| 2,455,544 | Yonkers | Dec. 7, 1948 |
| 2,508,906 | Cunningham et al. | May 23, 1950 |

FOREIGN PATENTS

| | | |
|---|---|---|
| 369,567 | Germany | Feb. 20, 1923 |
| 770,503 | France | Sept. 15, 1934 |
| 851,146 | France | Jan. 3, 1940 |